United States Patent
Bendikas et al.

(10) Patent No.: US 6,368,064 B1
(45) Date of Patent: Apr. 9, 2002

(54) APPARATUS AND METHOD OF PROVIDING REDUNDANT POWER AND REDUNDANT FAN SPEED CONTROL TO A PLURALITY OF FANS

(75) Inventors: Laura M. Bendikas, Chicago; Dane L. Greives, Buffalo Grove, both of IL (US)

(73) Assignee: 3COM Corporation, Rolling Meadows, IL (US)

( * ) Notice: Subject to any disclaimer, the term of this patent is extended or adjusted under 35 U.S.C. 154(b) by 0 days.

(21) Appl. No.: 09/728,461

(22) Filed: Dec. 1, 2000

(51) Int. Cl.$^7$ ................................................. F04B 41/06
(52) U.S. Cl. ................... 417/2; 417/3; 417/5; 318/563; 318/564; 318/599; 363/41
(58) Field of Search ........................... 417/2, 3, 5, 44.1; 318/563, 564; 363/41

(56) References Cited

U.S. PATENT DOCUMENTS

| | | | |
|---|---|---|---|
| 5,136,465 A | * 8/1992 | Benck et al. | 361/384 |
| 5,206,810 A | * 4/1993 | Bools et al. | 364/431.02 |
| 5,259,731 A | * 11/1993 | Dhindsa et al. | 417/3 |
| 5,546,272 A | * 8/1996 | Moss et al. | 361/687 |
| 5,787,971 A | * 8/1998 | Dodson | 165/121 |
| 5,963,887 A | * 10/1999 | Giorgio | 702/64 |
| 6,257,832 B1 | * 7/2001 | Lyszkowski et al. | 417/2 |

FOREIGN PATENT DOCUMENTS

US   0 588 414 A1   * 12/1994

* cited by examiner

Primary Examiner—Charles G. Freay
Assistant Examiner—Han L Liu
(74) Attorney, Agent, or Firm—Baniak Pine & Gannon

(57) ABSTRACT

An apparatus and method for providing redundant power and redundant fan speed control to a plurality of fans is provided. A first power supply input is electrically connected to a second power supply input to provide a combined power supply input. First and second fan speed controllers each having an input and an output are provided, along with first and second power converters each having an input and an output. The combined power supply input is electrically connected to the input of the first fan speed controller and the input of the first power converter. The combined power supply input is also electrically connected to the input of the second fan speed controller and the input of the second power converter. The output of the first fan speed controller is electrically combined with the output of the second fan speed controller to provide a combined fan speed control signal. The combined fan speed control signal is electrically connected to the plurality of fans. The output of the first power converter is electrically combined with the output of the second power converter to provide a combined fan voltage. The combined fan voltage is electrically connected to the plurality of fans.

15 Claims, 3 Drawing Sheets

APPARATUS AND METHOD OF PROVIDING REDUNDANT POWER AND REDUNDANT FAN SPEED CONTROL TO A PLURALITY OF FANS

FIELD OF THE INVENTION

The present invention relates to power supply scheme for a plurality of fans used to cool an electronic chassis, and in particular, to an apparatus and method of providing redundant power and redundant fan speed control to a plurality of fans housed within the electronic chassis.

BACKGROUND OF THE INVENTION

Conventional electronic chassis used for high speed switching and networking applications typically are comprised of a metallic box-shaped card cage. Numerous circuit board modules (otherwise known as application cards) are slid into the electronic chassis along card guide assemblies, and are electrically attached to a backplane circuit board located along the backside of the chassis.

Each application card typically includes a large number of electronic components. As a result, these application cards generate a tremendous amount of heat, which must be removed from the chassis to protect the various electronic components within the chassis. As a result, conventional fans have been used to bring cooling air into the chassis, and, at the same time, to exhaust heated air from the chassis.

Various attempts have been made to reduce the temperature with an electronic chassis by providing a fan tray assembly, which includes a plurality of conventional fans. The fan tray assembly may then be housed within the chassis, typically along the top portion of the chassis. Cool air is circulated upward from the bottom of the chassis, through the chassis between the card guide assemblies, and the heated air is exhausted out through the top of the chassis.

Attempts have been made to provide a redundant power scheme to these conventional fans to allow the fans to continue to operate in the event of a power circuitry fail condition. For example, FIG. 2 illustrates one example of a conventional redundant power scheme 100 for a plurality of fans 102, 104. As shown in FIG. 2, power inputs 106, 108 are coupled together via a pair of diodes 110, 112. The combined power inputs 106, 108 are then fed to a single PWM driver 114 for providing fan speed control 115 and a single DC/DC converter 116 for providing voltage to the fans 102, 104. The outputs of the PWM driver 114 and the DC/DC converter 116 are then delivered to all of the fans 102, 104. At the same time, a power bypass-straight input voltage clamp 118 is coupled from the outputs of the diodes 110, 112 directly to the fans 102, 104. The voltage clamp 118 delivers the input voltage directly to the fans 102, 104 in the event that there is a failure of either the PWM driver 114 or the DC/DC converter 116. The input voltage is typically clamped at some specific number since the input power feeds may be as high as 72V.

There are many drawbacks to this conventional redundant power scheme. For example, the redundant power scheme shown in FIG. 2 does not allow for speed control of the fans 102, 104 under fault conditions. That is, when the power bypass clamp 118 is implemented, the fans 102, 104 typically operate at the level of the input voltage. This voltage is typically higher than the maximum operating voltage of the fans 102, 104. As a result, the fans 102, 104 will operate at full speed or greater, which may shorten the life of the fans 102, 104, and may possibly burn out the bearings of the fans or the internal circuitry of the fans. Moreover, operating the fans 102, 104 at an accelerated speed based on the input voltage may create unacceptable and undesirable levels of acoustic noise. As a result, this conventional method of power redundancy is not a desirable option with fans that have lower operating voltages (i.e. 12V or 24V).

FIG. 3 illustrates another example of a conventional redundant power scheme 150 for a plurality of fans 152, 154. As shown in FIG. 3, power input 156 is electrically coupled to a DC/DC converter 158, and power input 160 is electrically connected to a separate DC/DC converter 162. The outputs of the DC/DC converters 158, 160 are coupled together via diodes 164, 166 to provide load sharing, and to provide redundancy in the event that one of the two DC/DC converters 158, 162 fails. In this scenario, the input voltage is applied directly to the fans 152, 154, which minimizes the number of allowable speeds for the fans 152, 154. Moreover, this scenario does not provide full redundancy to allow the fans 152, 154 to operate normally in the event of certain failures. For example, if power input feed 156 shuts down and the DC/DC converter 162 shuts down, then the fans 152, 154 will not receive any power. Similarly, if power input feed 160 shuts down and the DC/DC converter 158 shuts down, then the fans 152, 154 likewise will not receive any power.

Accordingly, it would be desirable to provide an apparatus and method of providing redundant power and redundant fan speed control to a plurality of fans that overcomes the disadvantages described above.

SUMMARY OF THE INVENTION

One aspect of the invention provides an apparatus for providing redundant power and redundant fan speed control to a plurality of fans. A first power supply input is electrically connected to a second power supply input to provide a combined power supply input. First and second fan speed controllers each having an input and an output are also provided, along with first and second power converters each having an input and an output. The combined power supply input is electrically connected to the input of the first fan speed controller and to the input of the first power converter. The combined power supply input is also electrically connected to the input of the second fan speed controller and the input of the second power converter. The output of the first fan speed controller is electrically combined with the output of the second fan speed controller to provide a combined fan speed control signal. The combined fan speed control signal is electrically connected to the plurality of fans. The output of the first power converter is electrically combined with the output of the second power converter to provide a combined fan voltage. The combined fan voltage is electrically connected to the plurality of fans. Each of the first and second fan speed controllers may preferably be a PWM driver. The plurality of fans may preferably be comprised of at least to two fans. The at least two fans may preferably be comprised of eight fans. A first diode having an input and an output, and a second diode having an input and an output may also be provided. The input of the first diode may preferably be electrically connected to the first power supply input, and the input of the second diode may preferably be electrically connected to the second power supply input. The output of the first diode may preferably be electrically connected to the output of the second diode. A third diode having an input and an output, and a forth diode having an input and an output may also be provided. The input of the third diode may preferably be electrically connected to the output of the first fan speed controller, and the input of the fourth diode may preferably be electrically connected to the output of the second fan speed controller. The output of the third diode may preferably be electrically connected to the output of the fourth diode. A fifth diode having an input and an output, and a sixth forth diode having an input and,an output may also be provided. The input of the fifth diode may preferably be electrically connected to the output of the first power converter. The input of the sixth diode may preferably be electrically connected to the output of the second power converter. The output of the fifth diode may preferably be electrically connected to the output of the sixth diode. The first power supply input may preferably be comprised of 48V, and the second power supply input may preferably be comprised of 48V. The combined fan speed control signal may preferably be electrically distributed to each of the plurality of fans. Similarly, the combined fan voltage may preferably be electrically distributed to each of the plurality of fans.

Another aspect of the invention provides a method of providing redundant power and redundant fan speed control to a plurality of fans. A first power supply input and a second power supply input are provided. First and second fan speed controllers each having an input and an output may also be provided. Finally, first and second power converters each having an input and an output may also be provided. The first power supply input is electrically connected to the second power supply input to provide a combined power supply input. The combined power supply input is electrically connected to the input of the first fan speed controller and the input of the first power converter. The combined power supply input is electrically connected to the input of the second fan speed controller and the input of the second power converter. The output of the first fan speed controller is electrically combined with the output of the second fan speed controller to provide a combined fan speed control signal. The combined fan speed control signal is electrically connected to the plurality of fans. The output of the first power converter is electrically combined with the output of the second power converter to provide a combined fan voltage. The combined fan voltage is electrically connected to the plurality of fans. Each of the first and second fan speed controllers may preferably be a PWM driver. The plurality of fans may preferably be comprised at least to two fans. The at least two fans may preferably be comprises of eight fans. A first diode having an input and an output, and a second diode having an input and an output may also be provided. The input of the first diode may preferably be electrically connected to the first power supply input. The input of the second diode may preferably be electrically connected to the second power supply input. The output of the first diode may preferably be electrically connected to the output of the second diode. A third diode having an input and an output, and a forth diode having an input and an output may also be provided. The input of the third diode may preferably be electrically connected to the output of the first fan speed controller. The input of the fourth diode may preferably be electrically connected to the output of the second fan speed controller. The output of the third diode may preferably be electrically connected to the output of the fourth diode. A fifth diode having an input and an output, and a sixth forth diode having an input and an output may also be provided. The input of the fifth diode may preferably be electrically connected to the output of the first power converter. The input of the sixth diode may preferably be electrically connected to the output of the second power converter. Finally, the output of the fifth diode may preferably be electrically connected to the output of the sixth diode.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and the equivalents thereof.

DETAILED DESCRIPTION OF THE PRESENTLY PREFERRED EMBODIMENTS

Figure 1:
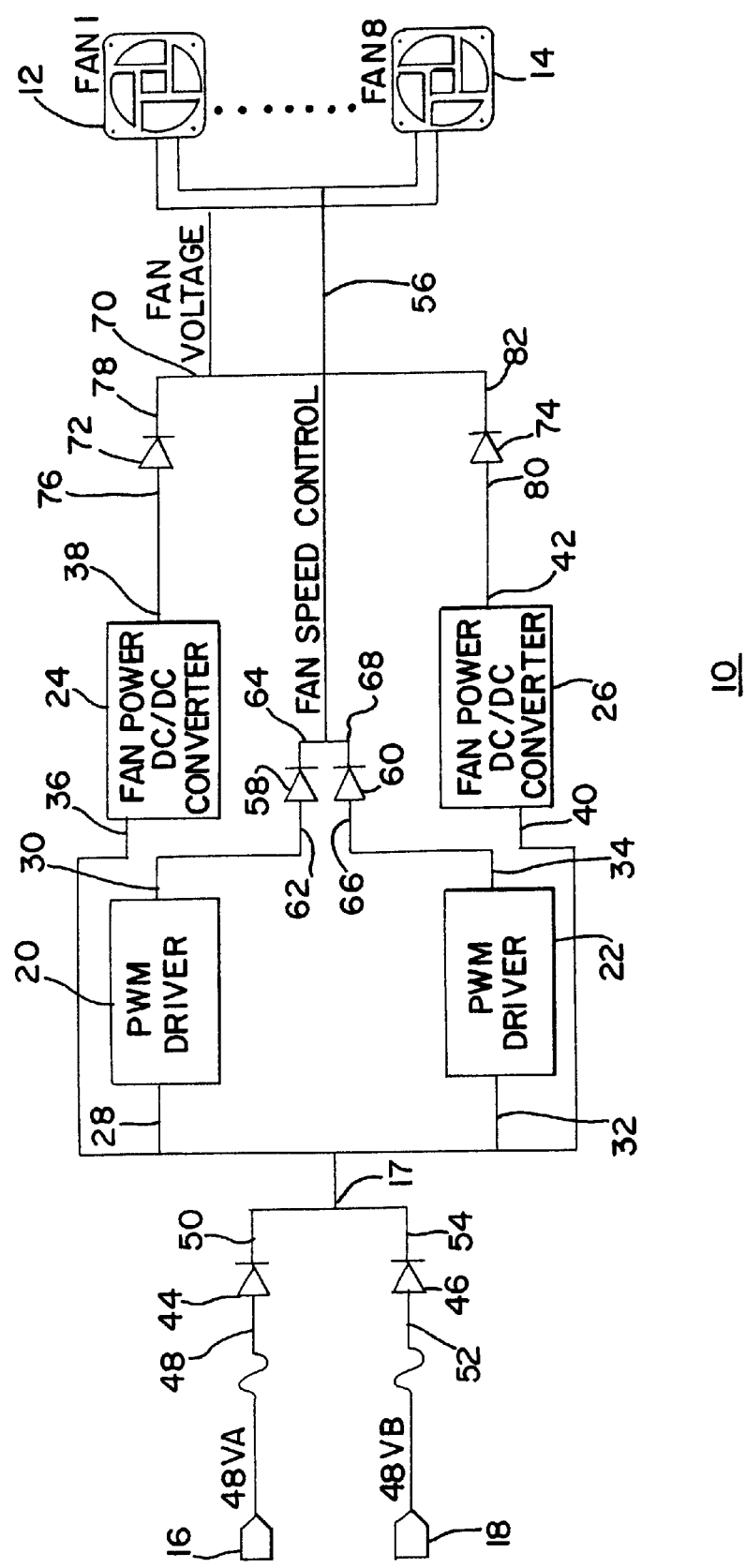
FIG. 1 is a block diagram of a preferred embodiment of an apparatus and method of providing redundant power and redundant fan speed control to a plurality of fans that is made in accordance with the invention.
Figure 2:
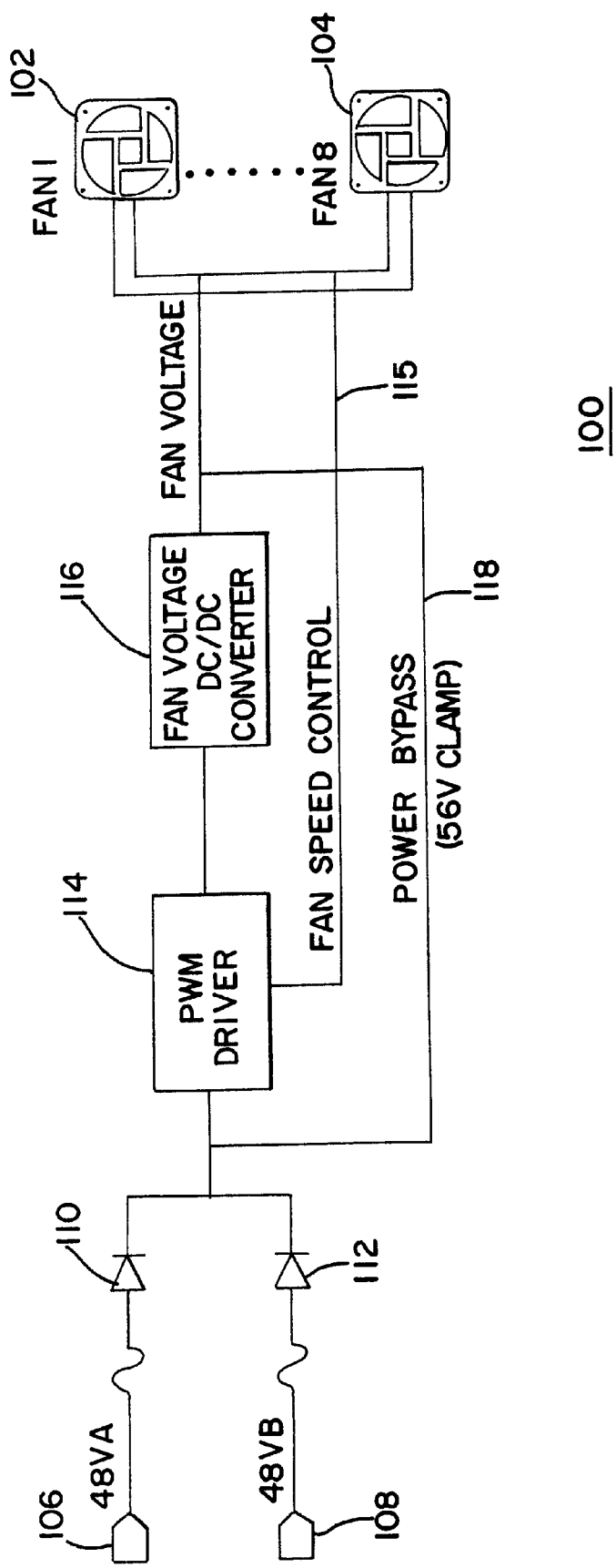
FIG. 2 is block diagram of a conventional redundant power scheme for a plurality of fans.
Figure 3:
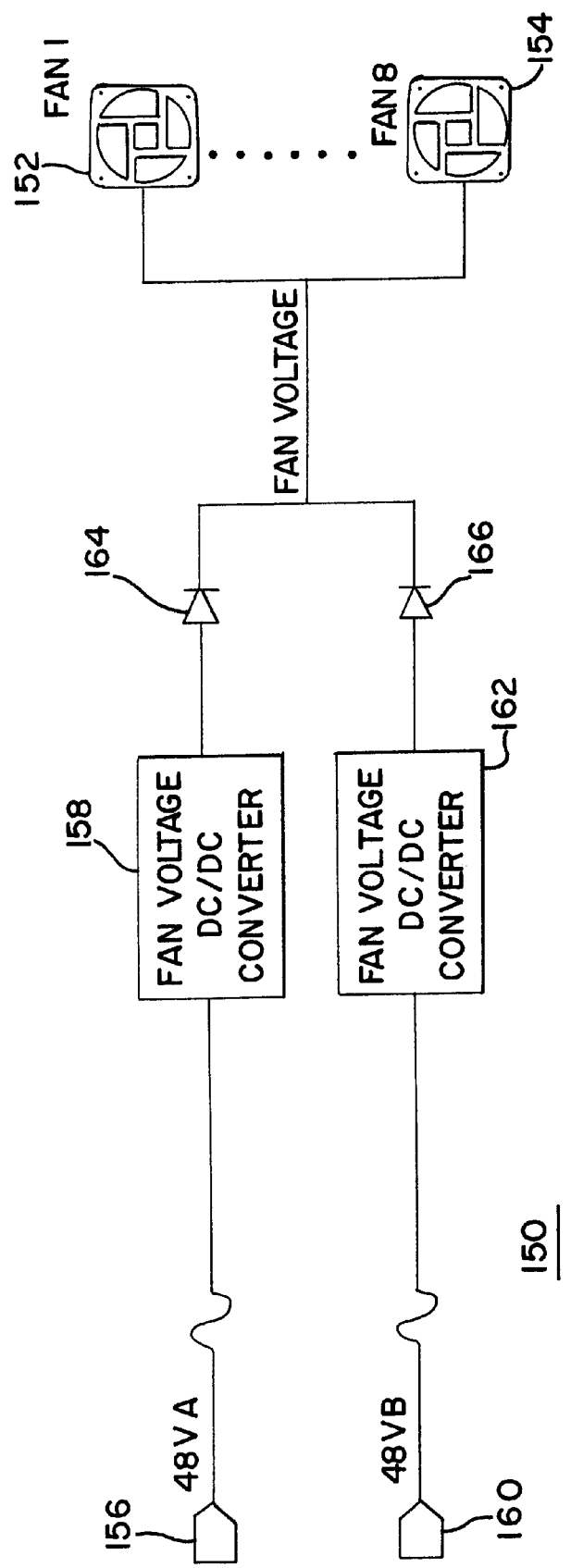
FIG. 3 is a block diagram of another conventional redundant power scheme for a plurality of fans.

Referring to FIG. 1, an apparatus 10 for providing redundant power and redundant fan speed control to a plurality of fans 12, 14 is provided. The number of fans 12, 14 may vary upon the particular application. For example, the apparatus 10 may preferably provide redundant power to eight fans. Each of the fans 12, 14 may preferably be any conventional fan adapted to be mounted within a fan tray (not shown), which in turn is configured to be positioned within a top portion of an electronic chassis (not shown) to provide cooling for the electronic components within the chassis. For example, each of the fans 12, 14 may preferably be any brushless fan such as the one manufactured by Delta Electronics, Inc., model number FFB1248SHE.

Referring again to FIG. 1, the apparatus 10 further includes a first power supply input 16, a second power supply input 18, first and second fan speed controllers 20, 22 (identified in FIG. 1 as PWM (pulse width modulator) drivers), and first and second power converters 24, 26 (identified in FIG. 1 as DC/DC converters). In the embodiment shown, the first fan speed controllers 22 includes an input 28 and an output 30, and the second fan speed controller 20 includes an input 32 and an output 34. Similarly, the first power converter 24 includes an input 36 and an output 38, and the second power converter 26 includes an input 40 and an output 42. In the embodiment shown, the first and second power supply inputs 16, 18 are combined to provide a combined power supply input 17. The first and second power supply inputs 16, 18 and the combined power supply input 17 ensure that redundant power is provided to the plurality of fans 12, 14.

The first and second power supply inputs 16, 18 may preferably be combined in any conventional manner. In the embodiment shown in FIG. 1, for example, first and second diodes 44, 46 are provided to combine the first and second power supply inputs 16, 18. In particular, the first diode 44 includes an input 48 and an output 50. Similarly, the second diode 46 includes an input 52 and an output 54. In the embodiment shown, for example, the first power supply input 16 is electrically connected to the input 48 of the first diode 44, and second power supply input 18 is electrically connected to the input 52 of the second diode 46. The output 50 of the first diode 44 is electrically connected to the output 54 of the second diode 46 to provide the combined power supply input 17. The first and second power supply inputs 16, 18 may each preferably be 48V, although a wide range of voltages (i.e. −36V to −75V DC) is contemplated depending upon the particular application.

Referring again to FIG. 1, the combined power supply input 17 is then again split into two and is divided between the first fan speed controller 20 and the first power converter 24 on the one hand, and the second fan speed controller 22 and the second power converter 26 on the other hand. In particular, the combined power supply input 17 is electrically connected to the input 28 of the first fan speed controller 20 and the input 36 of the first power converter. Similarly, the combined power supply input 17 is electrically connected to the input 32 of the second fan speed controller 22 and the input 40 of the second power converter 26. The first and second fan speed controllers 20, 22 may each preferably be any conventional PWM drivers capable of providing signals that control and maintain the speed of the plurality of fans 12, 14. The first and second power converters 24, 26 may each preferably be any conventional DC/DC converters for supplying the plurality of fans 12, 14 with direct current power. Each of the first and second fan speed controllers 20, 22 and the first and second power converters 24, 26 may preferably be configured to accommodate all of the plurality of fans 12, 14 within the system.

Referring again to FIG. 1, the outputs 30, 34 of the first and second fan speed controllers 20, 22 are combined to provide a combined fan speed control signal 56. The first and second fan speed controllers 20, 22 and the combined fan speed control signal 56 ensure that redundant fan speed control is provided to the plurality of fans 12, 14. The outputs 30, 34 of the first and second fan speed controllers 20, 22 may preferably be combined in any conventional manner. In the embodiment shown, for example, third and fourth diodes 58, 60 are provided to combine the outputs 30 and 34 of the first and second fan speed controllers 20, 22. In particular, the third diode 58 includes an input 62 and an output 64. Similarly, the fourth diode 60 includes an input 66 and an output 68. In the embodiment shown, for example, the output 30 of the first fan speed controller 20 is electrically connected to the input 62 of the third diode 58, and the output of the 34 of the second fan speed controller 22 is electrically connected to the input 66 of the fourth diode 60. The output 64 of the third diode 58 is electrically connected to the output 68 of the fourth diode 60 to provide the combined fan speed control signal 56. The combined speed control signal 56 may then preferably be distributed individually to each of the fans 12, 14.

The outputs 38, 42 of the first and second power converters 24, 26 are combined to provide a combined fan voltage 70. The first and second power converters 24, 26 and the combined fan voltage 70 ensure that redundant power to the plurality of fans 12, 14 is provided. The outputs 38, 42 of the first and second power converters 24, 26 may preferably be combined in any conventional manner. In the embodiment shown, for example, fifth and sixth diodes 72, 74 are provided to combine the outputs 38 and 42 of the first and second power converters 24, 26. Alternatively, the outputs 38 and 42 of the first and second power converters 24, 26 may preferably be combined with conventional relays (depending upon current level requirements of the fans 12, 14). Referring again to FIG. 1, the fifth diode 72 includes an input 76 and an output 78. Similarly, the sixth diode 74 includes an input 80 and an output 82. The output 38 of the first power converter 24 is electrically connected to the input 76 of the fifth diode 72, and the output of the 42 of the second power converter 26 is electrically connected to the input 80 of the sixth diode 74. The output 78 of the fifth diode 72 is electrically connected to the output 82 of the second diode 74 to provide the combined fan voltage 70. The combined fan voltage 70 may then preferably be distributed to the plurality of fans 12, 14.

There are many advantages to the apparatus 10 described above. For example, if either one of the first or second power converters 24, 26 fails, all of the fans 12, 14 will still receive constant power. If either one of the first or second fan speed controllers 20, 22 fails, the fans 12, 14 will still maintain their existing (i.e. "normal") speed at the time of the failure. Maintaining the existing fan speed during such a failure ensures that level of acoustic noise generated by the fans 12, 14 remains within acceptable levels. Also, in the embodiment shown, the fan speed can be changed if necessary, depending upon the thermal conditions within the electronic chassis (not shown). Finally, in either of the above mentioned fail conditions, or even they both occur simultaneously, an input power feed failure would still allow the plurality of fans 12, 14 to operate normally. For example, if the first fan speed controller 20 and the second power converter 26 each failed, and the first power supply input 16 failed, the plurality of fans 12, 14 would still operate normally. Thus, the apparatus 10 described above allows for two or even three failures while still maintaining normal fan operations for an extended period time of time.

As stated above, the fans 12, 14 may preferably be positioned in a fan tray (not shown), which in turn may be positioned into an electronic chassis (not shown) for cooling purposes. In a typically operating environment, the fans 12, 14 in the fan tray may preferably rotate at a RPM necessary to keep the chassis at or below a 15 degree C. rise from the ambient room temperature. The highest allowable temperature within the chassis determines the speed of the fans.

A common requirement for a conventional electronic chassis is that it must continue to operate for a period of time, such as, for example 96 hours, after a failure has occurred. This allows the service provider enough time to replace or repair the damaged equipment. The apparatus 10 described above allows for two or even three failures while still maintaining normal fan operations for a period of, for example, 96 hours.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An apparatus for providing redundant power and redundant fan speed control to a plurality of fans comprising:
 a first power supply input electrically connected to a second power supply input to provide a combined power supply input, a first and a second speed controller each having an input and an output, a first and a second power converter each having an input and a output, the combined power supply input electrically connected to the input of the first fan speed controller and the input of the first power converter, the combined power supply input electrically connected to the input of the second fan speed controller and the input of the second power converter, the output of the first fan speed controller electrically combined with the output of the second fan speed controller to provide a combined fan speed control signal, the combined fan speed control signal electrically connected to the plurality of fans, the output of the first power converter electrically combined with the output of the second power converter to provide a combined fan voltage, the combined fan voltage electrically connected to the plurality of fans.

2. The apparatus of claim 1 wherein the each of the first and second fan speed controllers is a PWM driver.

3. The apparatus of claim 1 wherein the at least two fans comprises eight fans.

4. The apparatus of claim 1 further comprising a first diode having an input and an output, and a second diode having an input and an output, the input of the first diode electrically connected to the first power supply input, the input of the second diode electrically connected to the second power supply input, wherein the output of the first diode is electrically connected to the output of the second diode.

5. The apparatus of claim 4 further comprising a third diode having an input and an output, and a fourth diode having an input and an output, the input of the third diode electrically connected to the output of the first fan speed controller, the input of the fourth diode electrically connected to the output of the second fan speed controller, wherein the output of the third diode is electrically connected to the output of the fourth diode.

6. The apparatus of claim 5 further comprising a fifth diode having an input and an output, and a sixth diode having an input and an output, the input of the fifth diode electrically connected to the output of the first power converter, the input of the sixth diode electrically connected to the output of the second power converter, wherein the output of the fifth diode is electrically connected to the output of the sixth diode.

7. The apparatus of claim 1 wherein the first power supply input is comprised of 48V and the second power supply input is comprised of 48V.

8. The apparatus of claim 1 wherein the combined fan speed control signal is electrically distributed to each of the plurality of fans.

9. The apparatus of claim 1 wherein the combined fan voltage is electrically distributed to each of the plurality of fans.

10. A method of providing redundant power and redundant fan speed control to a plurality of fans comprising:
   providing a first power supply input and a second power supply input, a first and a second fan speed controller each having an input and an output, and a first and a second power converter each having an input an and an output;
   electrically connecting the first power supply input to the second power supply input to provide a combined power supply input;
   electrically connecting the combined power supply input to the input of the first fan speed controller and the input of the first power converter;
   electrically connecting the combined power supply input to the input of the second fan speed controller and the input of the second power converter;
   electrically combining the output of the first fan speed controller with the output of the second fan speed controller to provide a combined fan speed control signal;
   electrically connecting-the combined fan speed control signal to the plurality of fans;
   electrically combining the output of the first power converter with the output of the second power converter to provide a combined fan voltage; and
   electrically connecting the combined fan voltage to the plurality of fans.

11. The method of claim 10 wherein the each of the first and second fan speed controllers is a PWM driver.

12. The method of claim 10 wherein the at least two fans comprises eight fans.

13. The method of claim 10 further comprising:
   providing a first diode having an input and an output, and a second diode having an input and an output;
   electrically connecting the input of the first diode to the first power supply input;
   electrically connecting the input of the second diode to the second power supply input; and
   electrically connecting the output of the first diode to the output of the second diode.

14. The method of claim 13 further comprising:
   providing a third diode having an input and an output, and a forth diode having an input and an output;
   electrically connecting the input of the third diode to the output of the first fan speed controller;
   electrically connecting the input of the fourth diode to the output of the second fan speed controller; and
   electrically connecting the output of the third diode to the output of the fourth diode.

15. The method of claim 14 further comprising:
   providing a fifth diode having an input and an output, and a sixth forth diode having an input and an output;
   electrically connecting the input of the fifth diode to the output of the first power converter;
   electrically connecting the input of the sixth diode to the output of the second power converter; and
   electrically connecting the output of the fifth diode to the output of the sixth diode.

* * * * *